Figures 1, 2, 3:
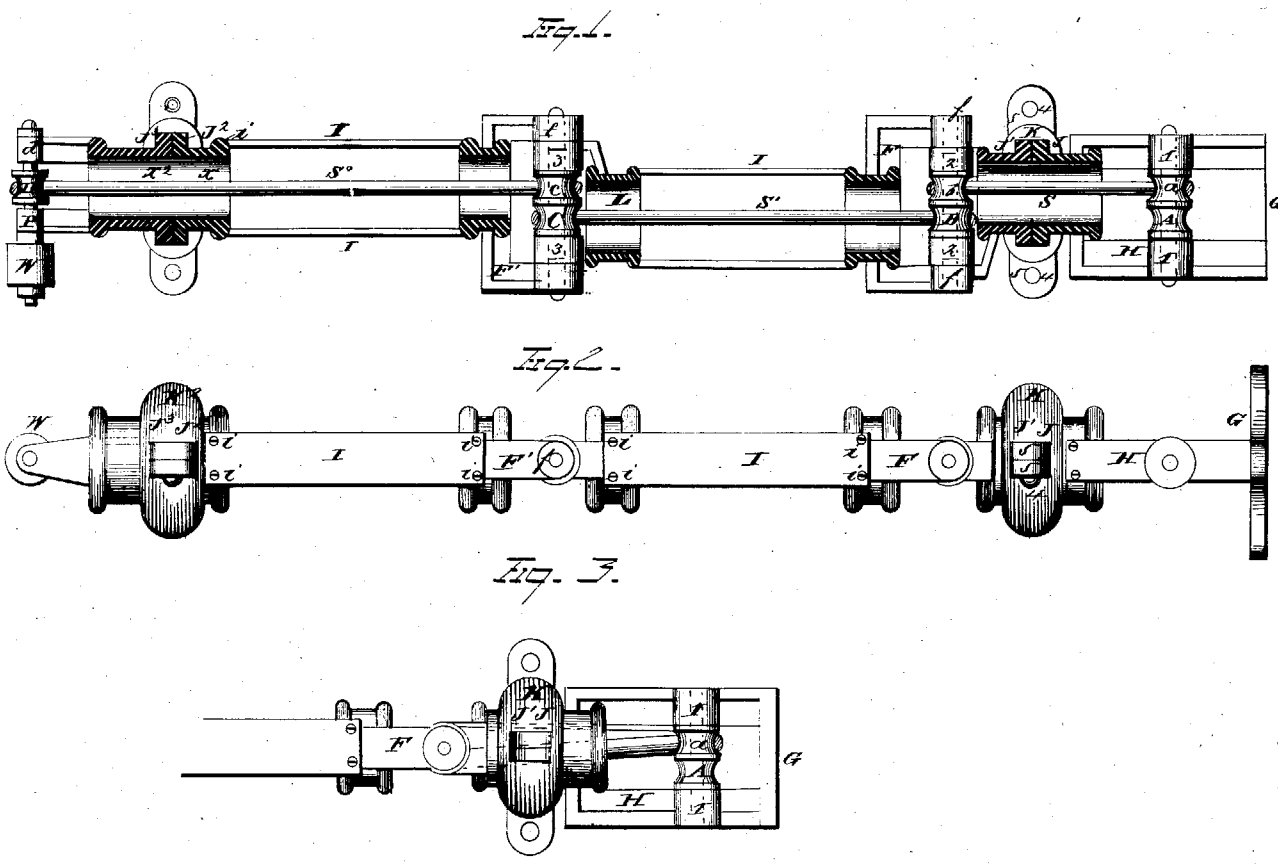

2 Sheets—Sheet 1.

G. COWING.

Assignor to E. H. COWLES & H. D. COWING.

Grinding-Machine.

No. 8,030. Reissued Jan. 8, 1878.

WITNESSES

Ed. J. Nottingham,

A. W. Bright

INVENTOR

George Cowing.

By Leggett & Leggett

ATTORNEY.

2 Sheets—Sheet 2.
G. COWING.
Assignor to E. H. COWLES & H. D. COWING.
Grinding-Machine.
No. 8,030. Reissued Jan. 8, 1878.
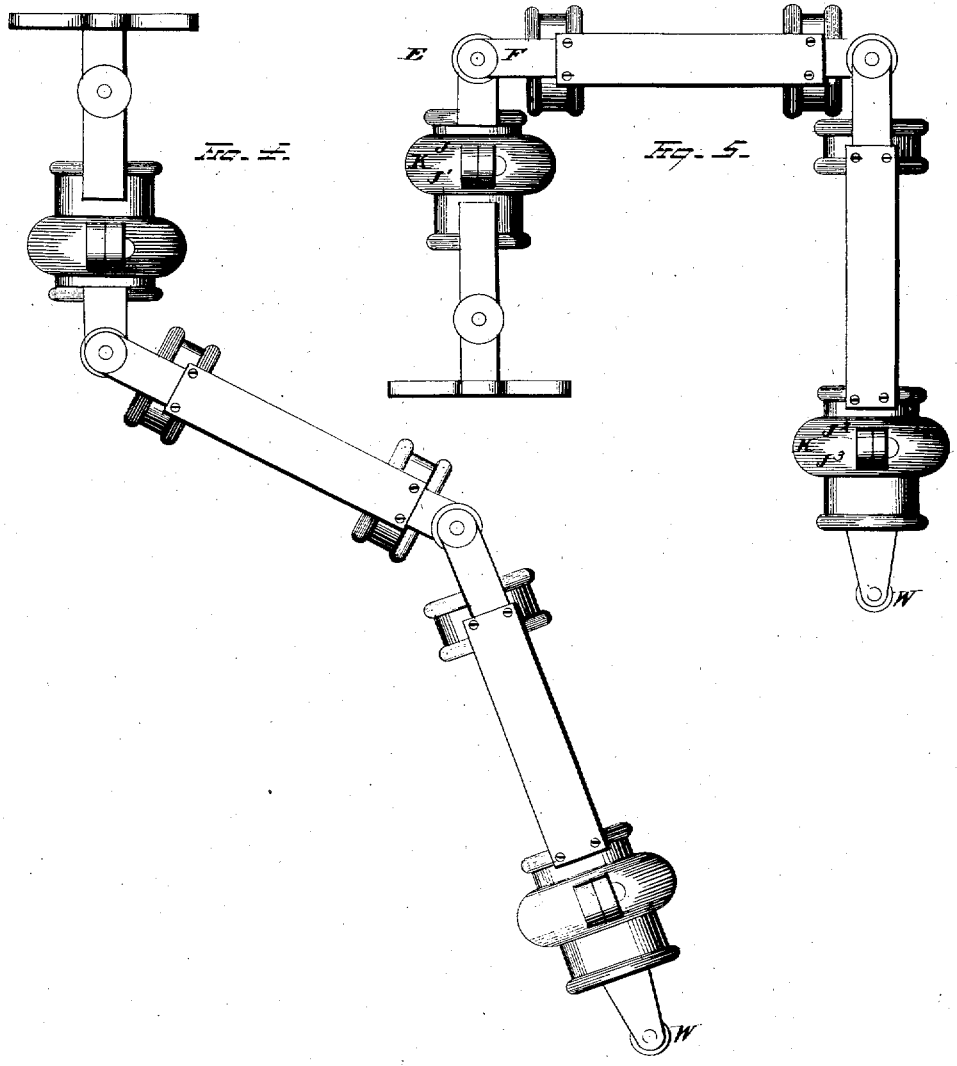
WITNESSES
Ed. S. Nottingham
A. W. Bright.
INVENTOR
George Cowing.
By Leggett and Leggett.
ATTORNEY

UNITED STATES PATENT OFFICE.

GEORGE COWING, OF SENECA FALLS, NEW YORK, ASSIGNOR TO EUGENE H. COWLES AND HELEN D. COWING.

IMPROVEMENT IN GRINDING-MACHINES.

Specification forming part of Letters Patent No. 38,565, dated May 19, 1863; Reissue No. 8,030, dated January 8, 1878; application filed September 15, 1877.

*To all whom it may concern:*

Be it known that I, GEORGE COWING, of Seneca Falls, in the county of Seneca and State of New York, have invented a new and useful Machine for Finishing Metallic Surfaces, or other purposes, which I designate a "Universal Finisher;" and I do hereby declare that the following is a full, clear, and exact description of the construction and operation of the same, reference being had to the annexed drawing, making a part of this specification, and to the letters of reference marked thereon.

The nature of my invention consists in the combination of a series of pulleys and joints with swivels in such a manner that motion may be communicated by means of bands running on said pulleys to the extremity of the series, while the joints are bent or swivels turned in any direction to adapt the wheel at the extremity to an irregular surface.

In the drawings, Figure 1 represents a section through center of machine; Fig. 2, a side elevation; Fig. 3, the machine turned on a swivel so that joints are at right angles. Fig. 4 is a side elevation of the machine with base fastened to the ceiling and joints bent; Fig. 5, a side elevation of the machine with base fastened to the floor and joints bent.

Corresponding letters represent the same part in the different drawings.

In Fig. 1, beginning at the upper part of the drawing, which represents the base of the machine, A *a* is a double pulley firmly fastened upon a single shaft, with bearings 1 1 in frame H. The lower end of the frame H is formed by a cylindrical ring, which permits the passage of a band from the pulley *a* through to the pulley in the next joint, and, at the same time, forms part of a swivel, having for this purpose a projection or flange, J, on its lower edge, corresponding to a similar flange, J′, on a similar ring, to which the bearings of the next double pulley and joint are attached. The flanges J J′ work smoothly upon each other, being held together by a ring, K, recessed for the purpose, and formed of two parts joined at opposite sides by means of lugs 5 5 and screws 4 4, the whole, so far as described, forming a swivel and joint, connecting the first frame, H, with the next frame, F, in such a manner that the frame F, with its pulleys B *b*, connected by a band to the pulleys A *a*, may be turned partially around upon frame H, as represented in Fig. 3, while the machine is in operation, and without interfering with the motion of the band.

The frame F is formed by a cylindrical ring similar to that described in frame H, having arms projecting from its sides, and reaching upward to the bearings upon similar arms projecting from the swivel above described. These bearings are connected by a shaft, and form a joint, the shafts of joint being in the same line with the shanks of the double pulley B *b*, thus allowing the joint to be bent without altering the distance between the pulleys A *a* and B *b* or interfering with the action of the band while the machine is in operation.

Attached to the frame F are suitable extensions I *i*, which may be made of any length required, reaching to the next cylindrical ring, L. The ring L has projections with bearings similar to those described in frame F, connecting with similar projections from the next frame, F′, and forming a joint similar to the one before described, with a double pulley, C *c*, having its axis on the line of the axis of the joint, as in the joint first described. By this arrangement of the pulleys upon the joints, the different sections of the machine may be bent in any direction without altering the tension of the bands.

The extensions I I connect the last-described joint with another cylindrical ring and swivel, *x*, similar to the one first described.

The lower or last ring of the swivel has projections with bearings *d d* for the shaft of the pulley D, which shaft projects through the bearing at one side, forming an arbor, upon which the finishing-wheel W is fastened.

When the machine is to be operated, the power is applied to the driving-pulley A, from which the motion is communicated by a band running over the pulley *a*, through the cylindrical rings, to the pulley *b* in the next joint. B then becomes a driving pulley for the next joint, and so on to the end of the series.

The base of the machine may be attached either to the ceiling, the wall, or floor of the room, and the joints extended or folded back, or the swivels turned around, so that the finishing-wheel may be held at any angle whatever, thus adapting it to any surface, however irregular, without interfering with the motion. If the machine be made large and heavy, it may be balanced by counter-weights, so as to be easily handled. It may be attached to the side wall of the room, and made to fold back like a gas-burner, or fastened to the floor, as shown in Fig. 5, with a cord and pulley to sustain it, as at E V.

The series of joints may be extended to any number required.

I do not claim a single joint or section as used in saw-frames having a joint or section for sawing off lumber, as they have been in use for many years. My invention, having a series of joints, is an entirely different machine.

What I claim is—

1. The combination, with the series of pulleys, respectively journaled in frames, of the cylindrical rings connecting the said frames in a swivel-joint, substantially as set forth.

2. The combination, with the series of pulleys, respectively formed on shafts adapted to have free axial rotation, of the frames in which the shafts have bearing, and the swivel-rings connecting the said frames, substantially as set forth.

3. The combination of the series of pulleys, respectively journaled in frames connected by cylindrical rings formed with annular flanges, which latter slide upon each other in annular rotation, and are held together by any interiorly-recessed locking-ring, substantially as set forth.

4. The combination, with the series of pulleys, respectively journaled in frames, the adjacent portions of which are formed with cylindrical rings, of the locking-ring, which holds the said cylindrical rings together, and yet admits of their free relative rotation, substantially as set forth.

5. The combination, with the double pulley-shafts, respectively journaled in frames formed with cylindrical rings, of extensions, as described, which connect the said rings, substantially as set forth.

6. The combination of two or more double pulley-shafts, respectively journaled in jointed frames, which latter are connected together by a swivel-joint, substantially as set forth.

7. The combination of two or more pulley-shafts, respectively supported in frames which are jointed in line with the said shafts, and are adapted to be turned or rotated relative to each other in a plane parallel with the axes of the said shafts, substantially as set forth.

8. The combination, with the series of pulleys, of the corresponding series of jointed frames in which the pulleys respectively have bearing, said frames being formed with adjacent cylindrical rings connecting in a swivel-joint, substantially as set forth.

9. The combination, with the series of pulley-shafts, journaled in respective frames which are jointed in axial line with the said shafts, of the swivel-ring joints connecting the said frames, substantially as set forth.

10. The combination, with the pulley-shafts, respectively journaled in frames jointed in axial line therewith, of the connecting cylindrical rings formed with annular sliding flanges, and the two-part locking-ring, substantially as set forth.

11. The combination, with the pulleys, jointed frames, and cylindrical rings, of the two-part locking-ring formed with an interior recess, which fits over the adjacent annular flanges on said rings, and is joined together by lugs and screws, substantially as set forth.

12. The combination, with the series of pulley-shafts, of the frames jointed in respective axial line therewith, said frames being formed with cylindrical rings having adjacent annular flanges, which are joined by a two-part ring whose interior central recess locks over the said flanges, substantially as set forth.

13. The combination, with the series of pulley-shafts, of the bearing-frames jointed in respective axial line therewith, said frames being formed with cylindrical rings, connected together by the described longitudinal extensions, substantially as set forth.

In testimony whereof I have hereunto set my hand this 6th day of September, 1877.

GEORGE COWING.

Witnesses:

F. TOUMEY,

W. E. DONNELLY.